(12) United States Patent
Kim

(10) Patent No.: US 8,931,276 B2
(45) Date of Patent: Jan. 13, 2015

(54) HYBRID RENEWABLE ENERGY SYSTEM HAVING UNDERGROUND HEAT STORAGE APPARATUS

(76) Inventor: Dongho Kim, Mission Hills, CA (US)

( * ) Notice: Subject to any disclaimer, the term of this patent is extended or adjusted under 35 U.S.C. 154(b) by 49 days.

(21) Appl. No.: 13/251,734

(22) Filed: Oct. 3, 2011

(65) Prior Publication Data

US 2012/0085093 A1    Apr. 12, 2012

(30) Foreign Application Priority Data

Oct. 6, 2010 (KR) .................. 10-2010-0097282

(51) Int. Cl.
| | |
|---|---|
| B60K 16/00 | (2006.01) |
| B60L 8/00 | (2006.01) |
| F03G 6/00 | (2006.01) |
| F01K 1/00 | (2006.01) |
| F01K 3/00 | (2006.01) |
| F25B 21/02 | (2006.01) |
| F25B 29/00 | (2006.01) |
| F28D 17/00 | (2006.01) |
| F28D 19/00 | (2006.01) |
| F28D 20/00 | (2006.01) |
| F24F 5/00 | (2006.01) |
| F24J 2/20 | (2006.01) |

(52) U.S. Cl.
CPC .......... *F28D 20/0052* (2013.01); *F24F 5/0046* (2013.01); *F24J 2/205* (2013.01); *F24F 2005/0057* (2013.01); *F24F 2005/0064* (2013.01); *Y02B 10/20* (2013.01); *Y02B 10/24* (2013.01); *Y02E 10/44* (2013.01); *Y02B 10/40* (2013.01); *Y02E 10/46* (2013.01); *Y02E 70/30* (2013.01); *Y02E 60/142* (2013.01)

USPC .......... 60/641.8; 60/626; 60/659; 165/48.2; 165/10; 62/3.7

(58) Field of Classification Search
USPC .......... 60/641.8–641.15; 165/10, 140–141, 4, 165/45, 48.2; 62/3.2, 3.3, 3.7
See application file for complete search history.

(56) References Cited

U.S. PATENT DOCUMENTS

| 3,168,362 | A | * | 2/1965 | Perkins ..................... 312/400 |
| 3,859,800 | A | * | 1/1975 | Wuelpern ................. 405/130 |
| 4,018,279 | A | * | 4/1977 | Reynolds et al. ........... 166/258 |
| 4,071,079 | A | * | 1/1978 | Engelbrecht .............. 165/48.1 |

(Continued)

FOREIGN PATENT DOCUMENTS

| KR | 10-2000-0023304 | 4/2000 |
| KR | 20-0427735 | 9/2006 |
| KR | 10-2006-0113236 | 11/2006 |

*Primary Examiner* — Kenneth Bomberg
*Assistant Examiner* — Deming Wan
(74) *Attorney, Agent, or Firm* — John K. Park; Park Law Firm

(57) ABSTRACT

Disclosed herein is a hybrid renewable energy system having an underground heat storage apparatus. A solar collector is provided on or around a building structure and collects solar heat to heat a heat medium. A transfer pipe transfers the heat medium, heated by the solar collector, into the underground. The heat storage apparatus stores heat received from the heat medium and heats, using the stored heat, both cold water supplied from the building structure through a supply pipe and air supplied from an inlet duct. A return pipe returns the heat medium from the heat storage apparatus to the solar collector. An inlet pipe supplies hot water produced by the heat storage apparatus to the building structure. A connection duct supplies air heated by the heat storage apparatus into the building structure to heat the room of the building structure.

12 Claims, 12 Drawing Sheets

(56) References Cited

U.S. PATENT DOCUMENTS

| | | | | |
|---|---|---|---|---|
| 4,211,213 A | * | 7/1980 | Nissen et al. | 126/563 |
| 4,324,947 A | * | 4/1982 | Dumbeck | 136/248 |
| 4,809,523 A | * | 3/1989 | Vandenberg | 62/483 |
| 6,660,927 B2 | * | 12/2003 | Zwanenburg | 136/244 |
| 6,701,914 B2 | * | 3/2004 | Schwarz | 126/400 |
| 2003/0033810 A1 | * | 2/2003 | Kreitmeier | 60/772 |
| 2005/0266539 A1 | * | 12/2005 | Hochberg et al. | 435/161 |
| 2007/0224929 A1 | * | 9/2007 | Chen | 454/900 |
| 2008/0173276 A1 | * | 7/2008 | Barnard et al. | 123/198 E |
| 2010/0025008 A1 | * | 2/2010 | Walford | 165/45 |

* cited by examiner

HYBRID RENEWABLE ENERGY SYSTEM HAVING UNDERGROUND HEAT STORAGE APPARATUS

BACKGROUND OF THE INVENTION

1. Field of the Invention

The present invention relates generally to hybrid renewable energy systems using solar heat, solar light, geothermal heat, wind power and atmospheric pressure and, more particularly, to a hybrid renewable energy system having an underground heat storage apparatus which stores high-temperature heat energy, obtained from solar energy, in an underground heat storage so that the stored energy can be used as a stable energy source, and in which descending high-density low-temperature air that is adjacent to the ground because of gravitational force is drawn into a heat exchanger of the underground heat storage apparatus and is heated by the heat exchanger to produce vertically-ascending wind power, thus generating a large amount of electricity using the wind power.

2. Description of the Related Art

Generally, various kinds of renewable energies that are currently in use have disadvantages so that they cannot be continuously and stably used depending on their application field.

Use of solar heat and light are restricted by weather conditions and the time. For instant, they cannot be used when it is cloudy, raining or snowing or at night.

Wind power also is subject to the constraints of time and place, because the intensity of wind varies according to the time or place. Digging into the ground to a depth of several hundreds of meters in only a particular area is required to obtain geothermal heat. Thus, economic feasibility is limited, and there is the locales are restricted.

Efficiency of the energy utilization of solar heat (80% or more) is four times or more that of solar light (lower than 20%). However, the fact is that the coefficient of utilization of solar heat is lower than that of solar light. The reason for this is that technologies or products that use solar heat have low technological and economic competitiveness.

Presently, in well-known technology using solar heat, a solar heat collection plate heats water which is a heat medium, and the heat water is stored in a heat storage tank and is secondarily heated by a boiler to produce hot water or water for heating a room that is of a desired temperature. This is old solar technology which was proposed about 40 years ago and is still being used to date without any developments having been made in innovative technology.

Furthermore, the conventional solar heat collection plate comprises a planar heat collection plate. There are two kinds of heat transfer methods used in a planar heat collection plate, including direct heat transfer due to solar heat and indirect heat transfer owing to air. The heating temperature and efficiency of the conventional planar heat collection plate cannot help being basically low.

A copper plate of the planar heat collection plate absorbs solar radiant heat of 300° C. or more but the temperature to which water is heated is actually 45° C. or less. In other words, the efficiency of the planar heat collection plate is very low. The reason for this is that the structure of the planar heat collection plate has low heat transfer efficiency because the area of the direct heat conduction surface that is the most critical portion is very small on the scale of ¼s of that of a heat absorption surface of the copperplate.

In addition, products, such as a dish concentrator, a parabolic concentrator, etc., were proposed, but these products have been mainly used for testing or research purposes in laboratories, universities, etc. or for low power generation. Moreover, because these products are very expensive and are economically infeasible, they cannot be used in building structures, such as general dwellings or the like. This is the reality of renewable solar energy technology.

The above-mentioned techniques imply background techniques in the art pertaining to the present invention rather than denoting the conventional techniques.

SUMMARY OF THE INVENTION

Accordingly, the present invention has been made keeping in mind the above problems occurring in the prior art, and an object of the present invention is to provide a hybrid renewable energy system which stores heat underground using solar energy or stores coldness underground and regenerates heat or coldness depending on the season to heat or cool a building structure, thus enhancing renewable energy efficiency.

Another object of the present invention is to provide a hybrid renewable energy system which stores high energy in an underground heat storage from unlimited solar energy and produces clean energy with low expenses anywhere 365 days a year 24 hours a day.

A further object of the present invention is to provide a high-temperature solar collector which is configured such that a heat absorption plate heats a heat medium over the entire area thereof, thus markedly increasing the efficiency of solar radiant heat absorption.

Yet another object of the present invention is to provide a high-temperature solar collector in which, unlike the conventional technique using water having an evaporation point of 100° C. as a heat medium, silicone oil having an evaporation point of 315° C. or more is used as a heat medium so that the temperature of the heat medium can become 200° C. or more.

Still another object of the present invention is to provide a hybrid renewable energy system in which a heat exchanger having air vent pipes is provided in a central portion of a heat storage apparatus so that heat of the heat medium supplied from the solar collector is easily transferred to and stored in heat storage members, such as stones, pebbles, sand, etc., which are stored in the underground heat storage apparatus.

Still another object of the present invention is to provide a hybrid renewable energy system which functions as an air conditioner in such a way that air is supplied into the heat exchanger, which is provided in the central portion of the heat storage apparatus and has the air vent pipes, by a blower fan and then heated by the heat exchanger, and the heated air is supplied into the room of the building structure through a duct to heat the room.

Still another object of the present invention is to provide a hybrid renewable energy system in which a solar electric module is provided on the top of the building structure to generate electricity using solar light, wherein some of generated electricity is used in the building structure, and the remaining electricity is used for heat storage in the heat storage apparatus in such a way that the electric energy is converted into heat energy by a thermoelectric element, so that the temperature in the heat storage apparatus can be further increased, thus innovating the technology that uses solar energy from the existing low-energy operation system into a high-energy operation system.

Still another object of the present invention is to provide a hybrid renewable energy system which uses atmospheric pressure, which is the force exerted against the earth's surface by the weight of air distributed to a height of 1000 km, as another renewable energy in such a way that the air is converted into hot air by heating it using solar heat and the hot air moves upwards to generate ascending wind power, thus producing electricity using the wind power.

In order to accomplish the above object, the present invention provides a hybrid renewable energy system, including: a solar collector provided on a building structure or in a vicinity of the building structure, the solar collector collecting solar heat to heat a heat medium that flows through a pipe conduit; a transfer pipe transferring the heat medium, heated by the solar collector, into an underground; a heat storage apparatus installed underground to store heat received from the heat medium transferred from the transfer pipe, the heat storage apparatus heating, using the stored heat, both cold water supplied from the building structure through a supply pipe and air supplied from an inlet duct; a return pipe returning the heat medium from the heat storage apparatus to the solar collector; an inlet pipe supplying hot water produced by the heat storage apparatus to the building structure; and a connection duct supplying air heated by the heat storage apparatus into the building structure to heat a room of the building structure.

The solar collector may include: a main pipe connected to the return pipe so that the heat medium flows from the return pipe into the main pipe; an auxiliary pipe connected to the transfer pipe so that the heat medium is supplied from the auxiliary pipe into the transfer pipe; and a heat absorption plate connected to a sidewall of the main pipe and a sidewall of the auxiliary pipe so that the heat medium flows along a passage defined in the heat absorption plate, the heat absorption plate having a corrugated shape to absorb heat using a reflective operation of a solar radiant heat.

Furthermore, a black paint layer may be formed on an upper surface of the heat absorption plate, the black paint layer increasing a solar heat absorption rate. The solar collector may further include a support bracket supporting the main pipe, the auxiliary pipe and the heat absorption plate.

The heat storage apparatus may include: a housing installed in an installation hole formed underground, the housing having a predetermined space therein; an underground heat storage configured such that inner and outer vicinity of the housing is filled with sand, and stones or pebbles are disposed in the housing; a heat exchanger installed in the underground heat storage in such a way that a bottom space is defined below the heat exchanger, wherein heat is stored in the underground heat storage by the heat medium that is transferred from the transfer pipe, and the heat medium which has passed through the heat exchanger is sent to the return pipe, the heat exchanger transferring the stored heat to cold water transferred form the supply pipe so that hot water is supplied into the building structure through the inlet pipe, the heat exchanger having a vent pipe along which cold air supplied from the inlet duct is moved upwards via the bottom space and is converted into hot air before being discharged to the connection duct; and a cover covering the heat exchanger.

The heat exchanger may include: a first heat exchanger configured such that the heat medium supplied from the transfer pipe transfers heat to the surrounding stones or pebbles to store the heat and is returned to the return pipe, the first heat exchanger being connected to the connection duct; a second heat exchanger provided around the first heat exchanger, the second heat exchanger transferring the stored heat from the stones or pebbles to cold water transferred from the supply pipe so that hot water is supplied into the inlet pipe, the second heat exchanger heating cold air, supplied from the inlet duct, while the cold air passes through the air vent pipes of the first heat exchanger via the bottom space before being supplied into the connection duct; and a support unit supporting the stones or pebbles provided in the first and second heat exchangers.

The first heat exchanger may include: a first supply member storing a high-temperature heat medium that is transferred from the transfer pipe and supplying the high-temperature heat medium; a plurality of first air pipes extending from the first supply member upwards and downwards, the first air pipes transferring heat from the heat medium, moving downwards around the first air pipes, to air flowing through the first air pipes so that the heated air is supplied to the connection duct; a plurality of first inner pipes surrounding the respective first air pipes in such a way that space is defined between each of the first inner pipes and the corresponding first air pipe so that the heat medium moves from the first supply member through the space; a plurality of first outer pipes disposed in such a way that each of the first outer pipes surrounds a lower end of the corresponding first air pipe, wherein while the heat medium that has moved along an outer surface of the first air pipe turns around on a lower end of the first inner pipe and moves upwards along an inner surface of the first outer pipe, the heat medium transfers heat to a vicinity thereof to store the heat; and a first storage member abutting a lower surface of the first supply member, the first storage member storing the heat medium that has been moved upwards by the first outer pipes, before the heat medium is returned to the return pipe.

The second heat exchanger may include: a second supply member storing cold water that is transferred from the supply pipe and supplying the cold water; a plurality of second air pipes extending from the second supply member upwards and downwards, the second air pipes transferring cold air, which is supplied from the inlet duct, downwards; a plurality of second inner pipes surrounding the respective second air pipes in such a way that space is defined between each of the first inner pipes and the corresponding first air pipe so that the cold water moves from the second supply member through the space; a plurality of second outer pipes disposed in such a way that each of the second outer pipes surrounds a lower end of the corresponding second air pipe, wherein while the cold water that has moved along an outer surface of the second air pipe turns around on a lower end of the second inner pipe and moves upwards along an inner surface of the second outer pipe, the cold water absorbs heat from a vicinity thereof and is converted into hot water; and a second storage member abutting on a lower surface of the second supply member, the second storage member storing the hot water that has moved upwards by the second outer pipes and supplying the hot water into the building structure through the inlet pipe.

The support unit may include: a net member surrounding a circumferential outer surface of the second heat exchanger, the net member keeping the stones or pebbles therein; a support shaft longitudinally disposed in a center of the first heat exchanger; and a plurality of support plates fastened to the support shaft at positions spaced apart from each other to form a multistory structure, the support plates supporting the stones or pebbles disposed in a space between the first and second outer pipes.

In addition, a first end of the connection duct may be connected to a boundary surface between the first heat exchanger and the second heat exchanger, and a second end of the connection duct may be connected to an upper portion of the building structure. A first end of the inlet duct may be connected to a circumferential edge of the second heat exchanger in such a way that the inlet duct is spaced apart from a circumferential outer surface of the connection duct by a predetermined distance.

Furthermore, a second end of the inlet duct may communicate with an outside air so that the outside air is drawn into the second end of the inlet duct, and a screen may be provided at an angle on the second end of the inlet duct.

Further, a second end of the inlet duct may be connected to the room of the building structure at a position lower than the connection duct.

The hybrid renewable energy system may further include: a turbine generator generating electricity in such a way that a fan is operated by hot air that ascends through the connection duct; and a steam jet unit provided on the connection duct, the steam jet unit supplying high-temperature and high-pressure steam to the hot air that ascends through the connection duct so as to further increase a temperature of the hot air using latent heat and increase a speed of a flow of the hot air.

The underground heat storage may include a plurality of thermoelectric elements applying heat to the stones or pebbles stored in the underground heat storage, the thermoelectric elements being operated by electricity produced by a solar electric module installed in the building structure or in the vicinity of the building structure.

The hybrid renewable energy system may further include a cold storage system installed in a shaded area in or around the building structure, the cold storage system storing coldness into the underground structure in a winter season and transferring the stored coldness into the building structure in a summer season to cool the room of the building structure.

The cold storage system may include: a coldness collector installed in a shaded area in or around the building structure, the coldness collector having a pipe along which a heat medium flows so that the heat medium absorbs coldness in the winter season; a cold storage apparatus supplying the heat medium from the coldness collector into the underground through a pipe and storing the coldness underground, the cold storage apparatus cooling air drawn therein from an inner duct and supplying the cooled air into the room of the building structure through an outer duct in the summer; and a cold air supply apparatus supplying cold air into the room of the building structure in such a way that a cold medium flowing through a coldness pipe receives the coldness that has been stored in the cold storage apparatus, and the cold medium is supplied to the building structure by a circulation pump.

The hot water supplied into the building structure through the inlet pipe may be used for a shower, hot water or heating the room.

The heat medium may comprise silicone oil.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
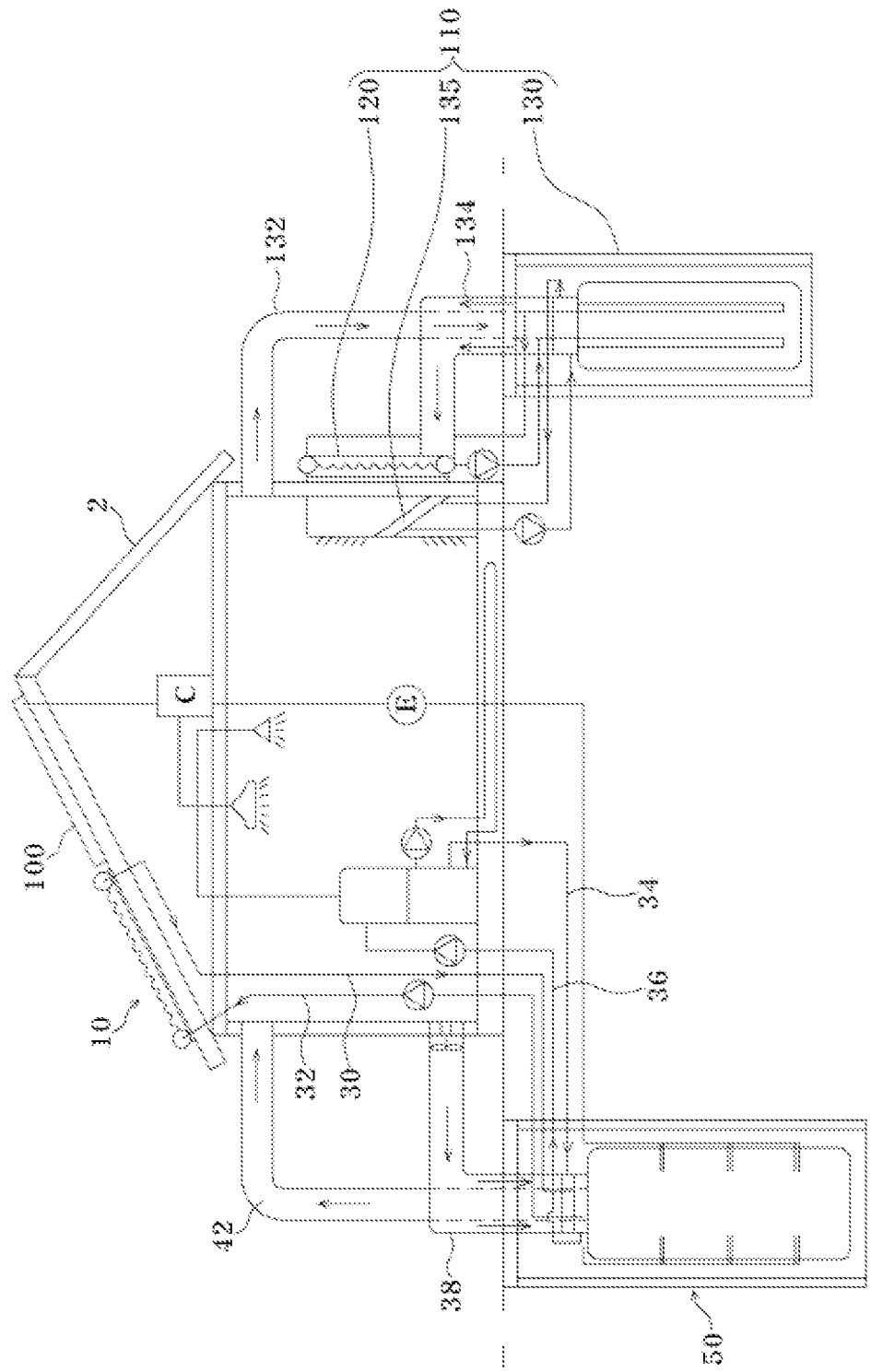
FIG. 1 is a schematic view showing the construction of a hybrid renewable energy system having an underground heat storage apparatus, according to an embodiment of the present invention.

Hereinafter, a hybrid renewable energy system having an underground heat storage apparatus according to the present invention will be described in detail with reference to the attached drawings.

In the drawings, the thicknesses of lines or the sizes of elements may be exaggerated to more clearly and conveniently illustrate the present invention. Furthermore, the terms used will be defined in consideration of their functions in the present invention, and thus the definition of these terms may be changed depending on the intention or practice of a user or operator. Therefore, the definitions of the terms must be based on the entire contents of the specification of the present invention.

Figure 2:
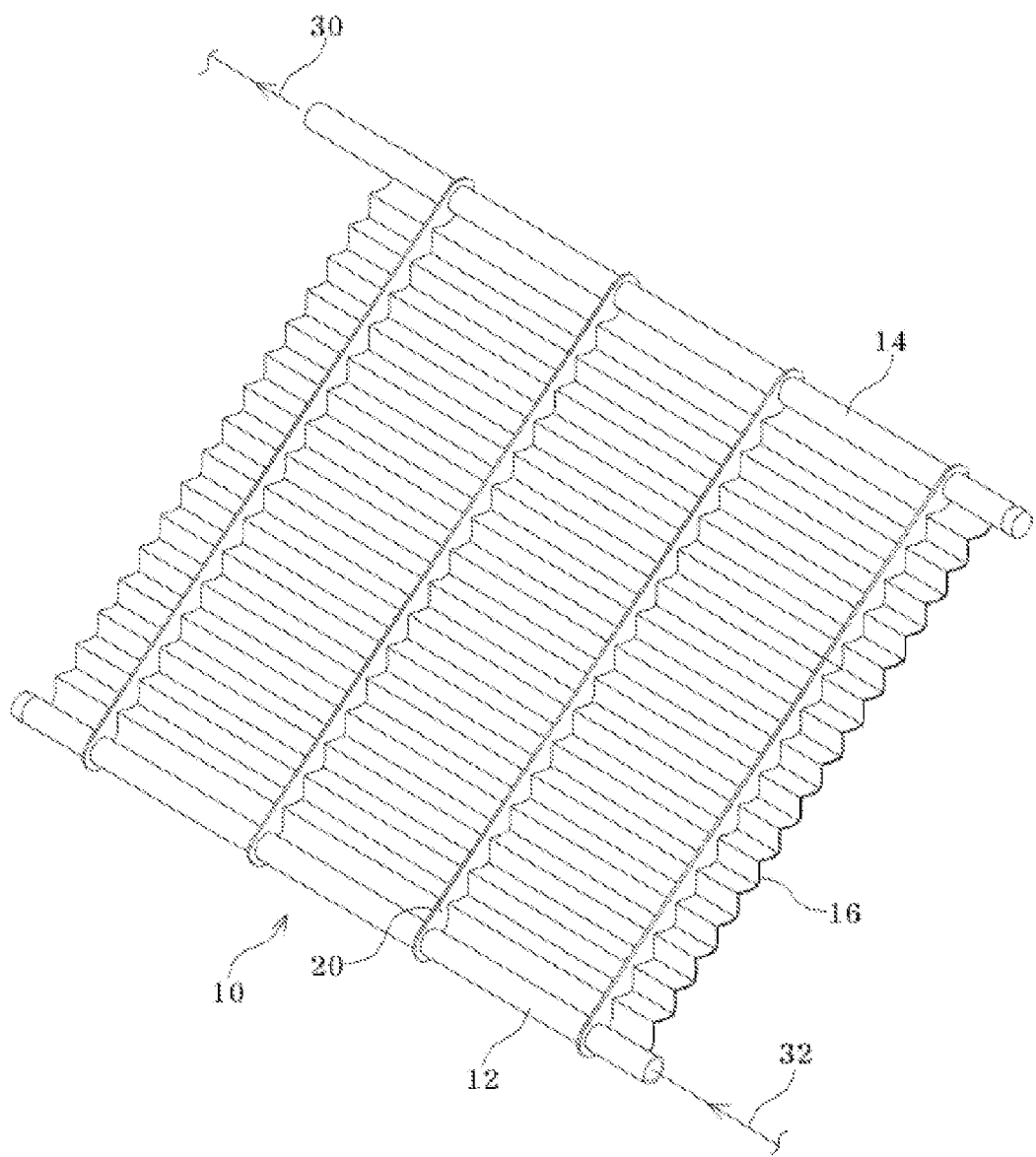
FIG. 2 is a perspective view of a solar collector according to the embodiment of the present invention.
Figure 3:
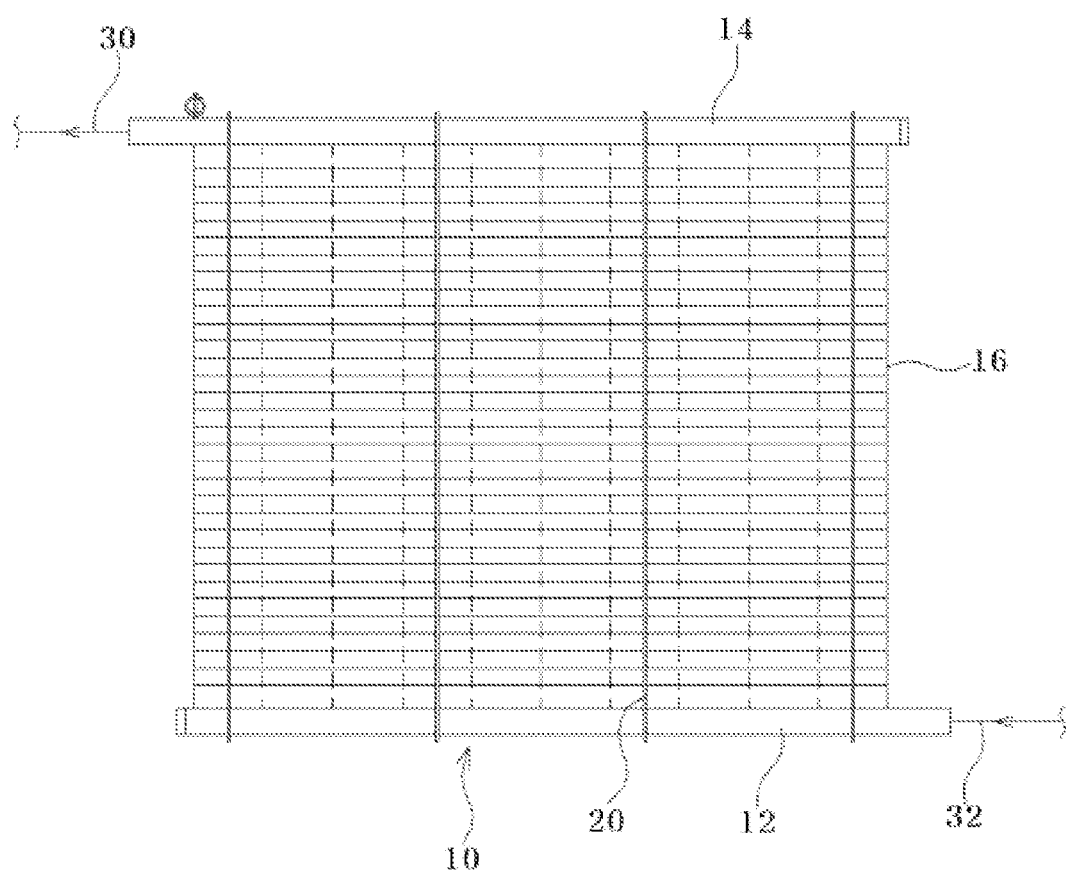
FIG. 3 is a plan view of the solar collector according to the embodiment of the present invention.
Figure 4:
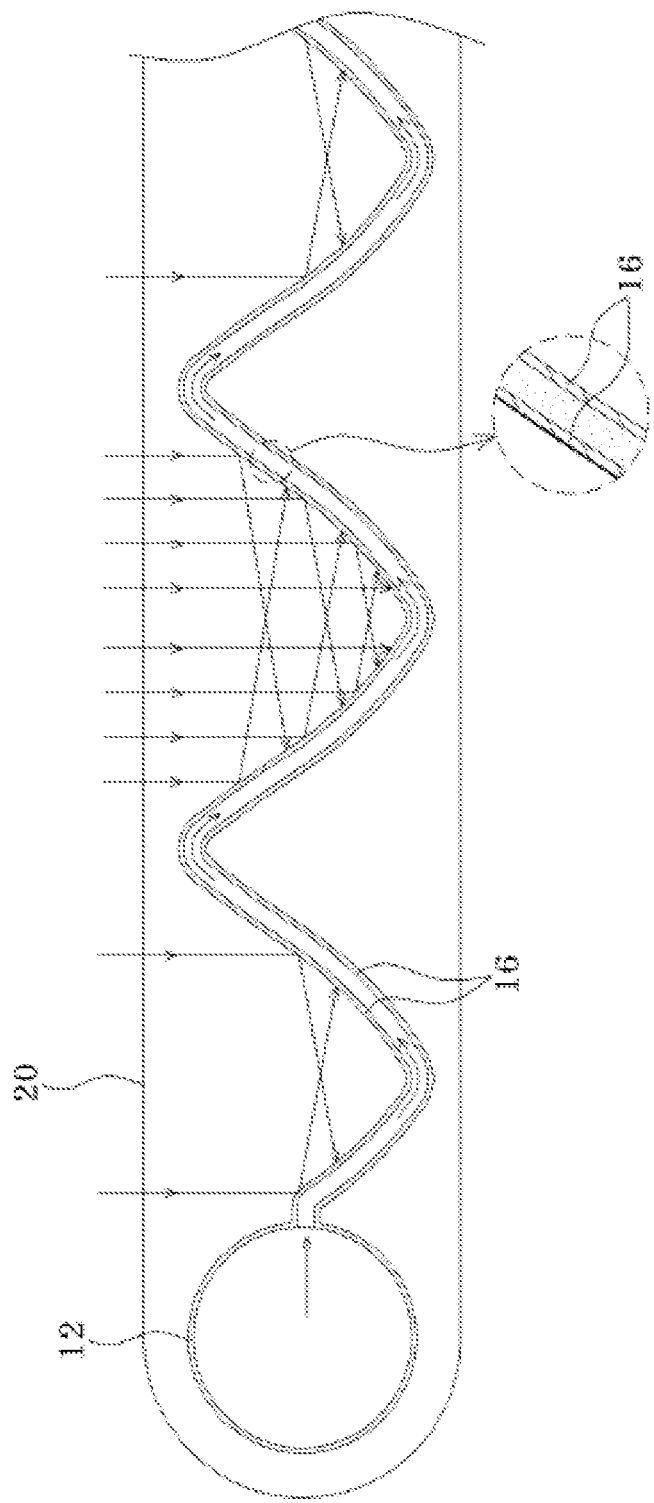
FIG. 4 is a sectional view showing a portion of the solar collector according to the embodiment of the present invention.
Figure 5:
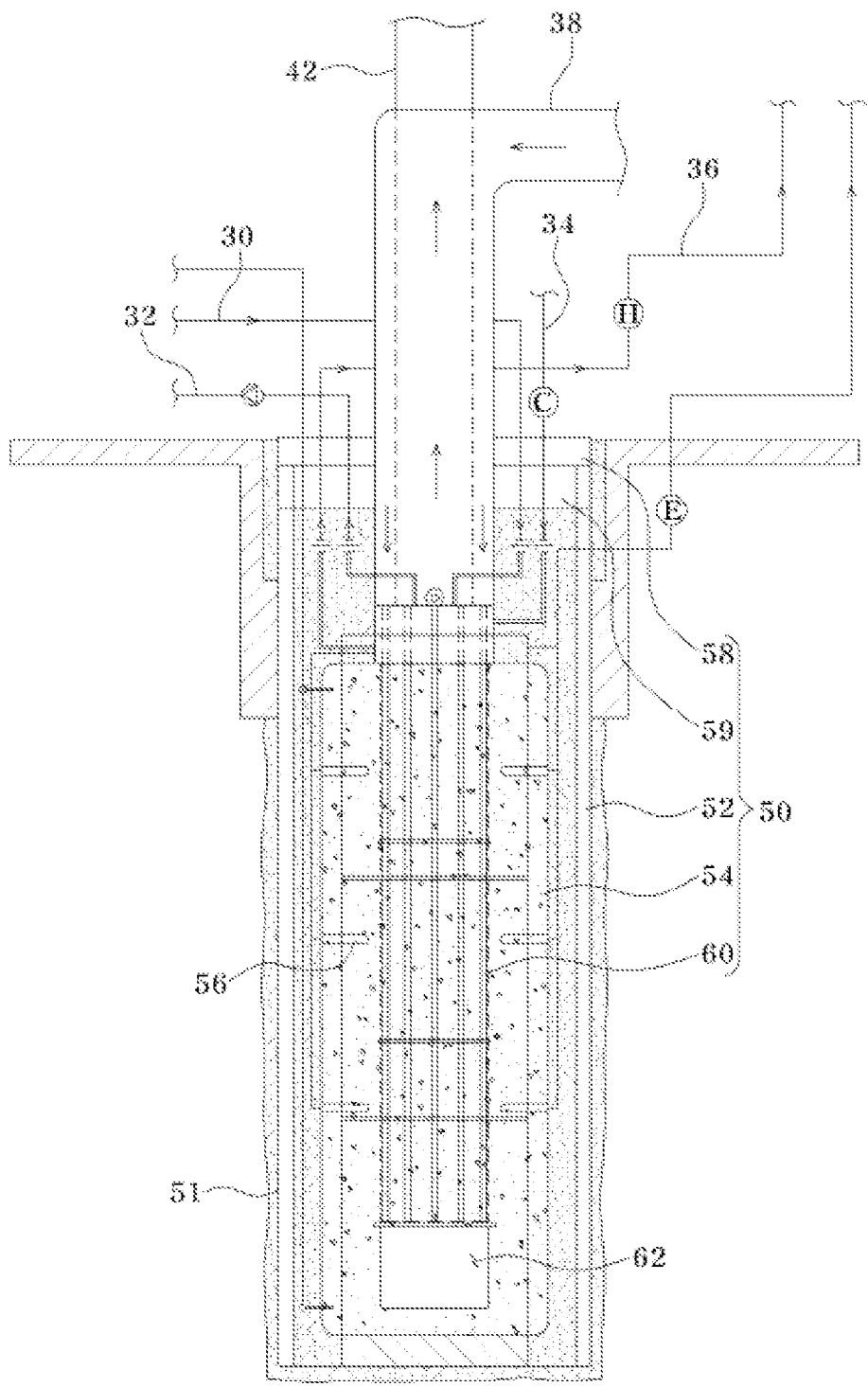
FIG. 5 is a sectional view showing the construction of the heat storage apparatus according to the present invention, illustrating an embodiment of a duct structure.
Figure 6:
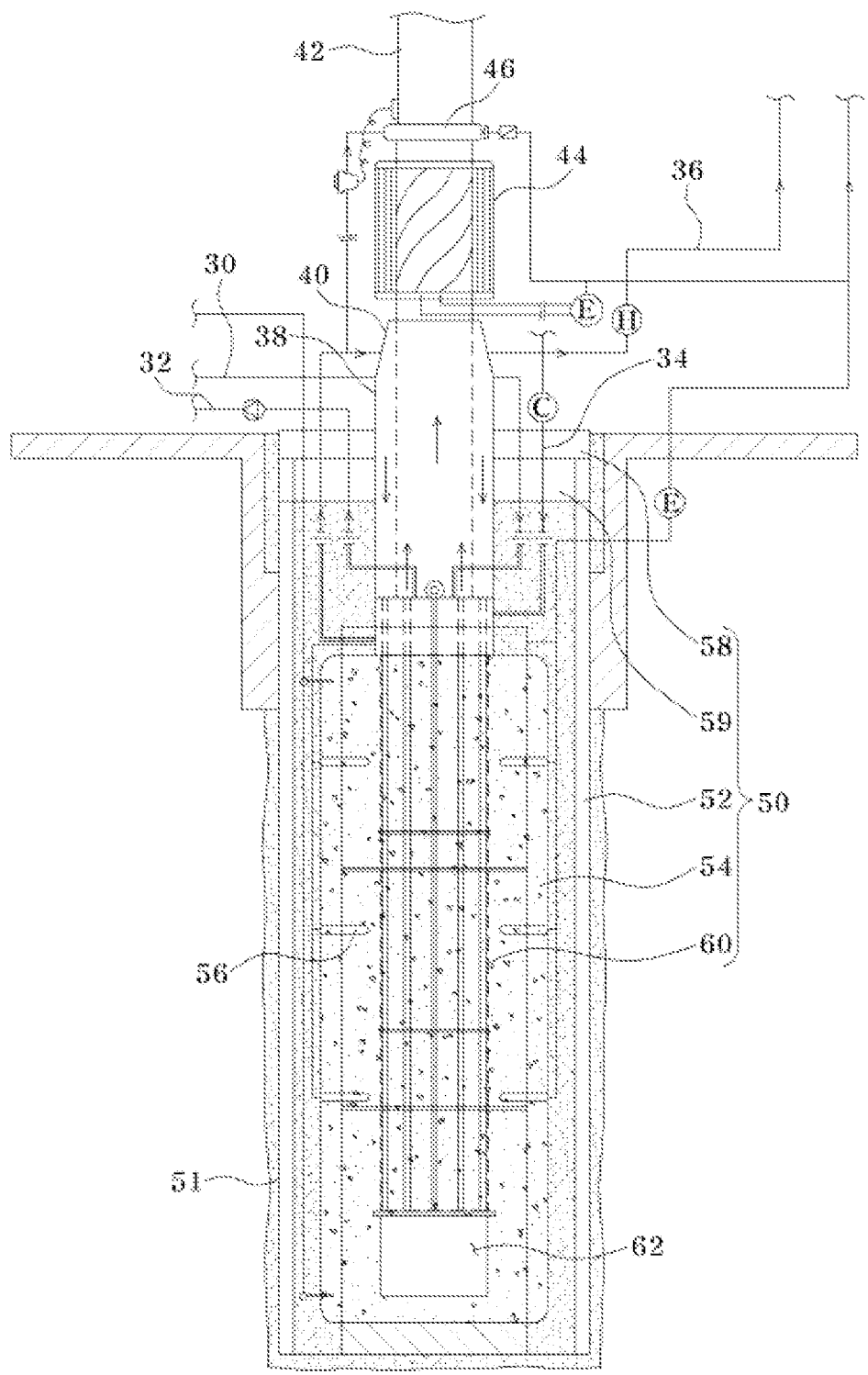
FIG. 6 is a sectional view showing the entire construction of the heat storage apparatus according to the present invention, illustrating another embodiment of a duct structure.
Figure 7:
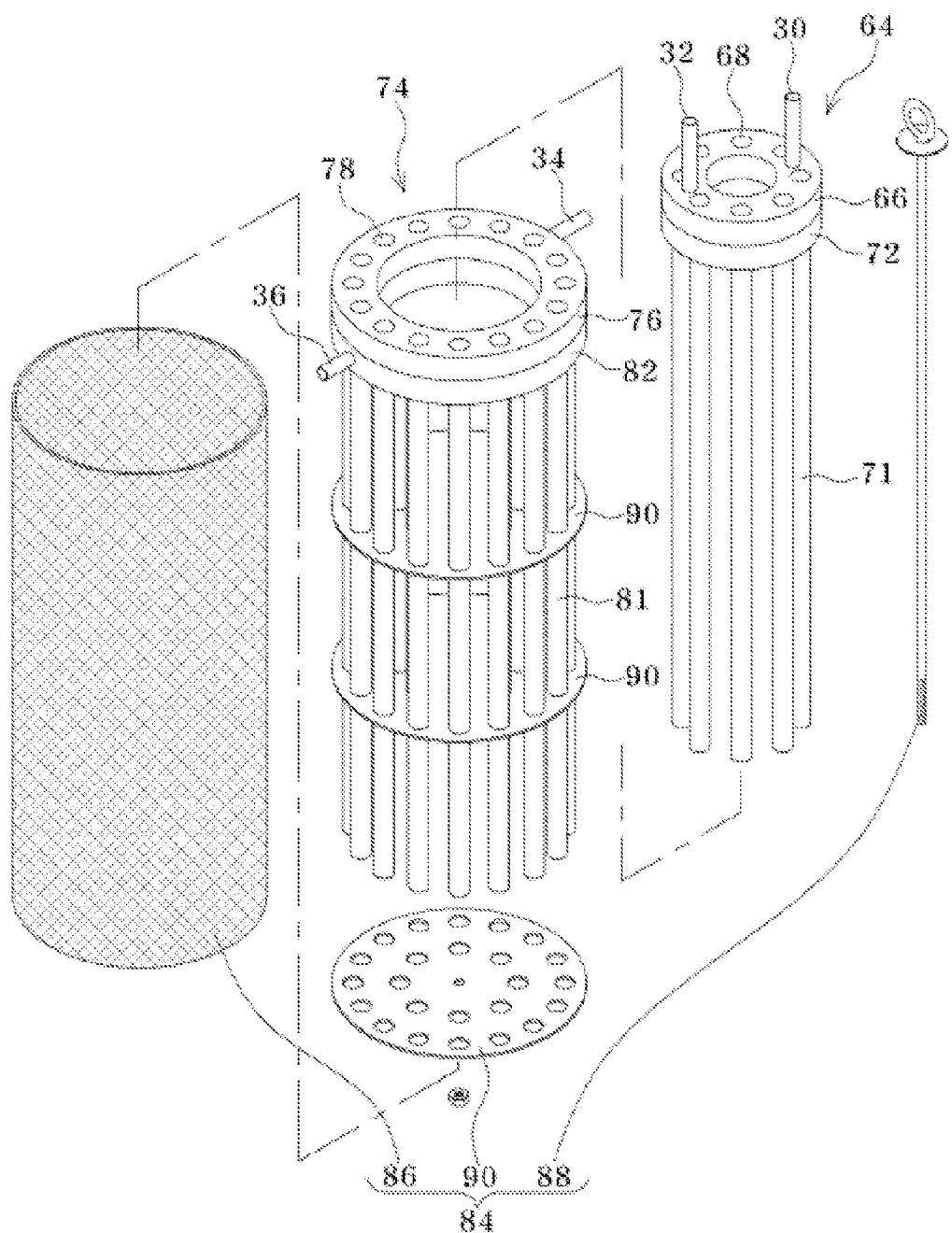
FIG. 7 is an exploded perspective of a heat exchanger of the heat storage apparatus according to the embodiment of the present invention.
Figure 8:
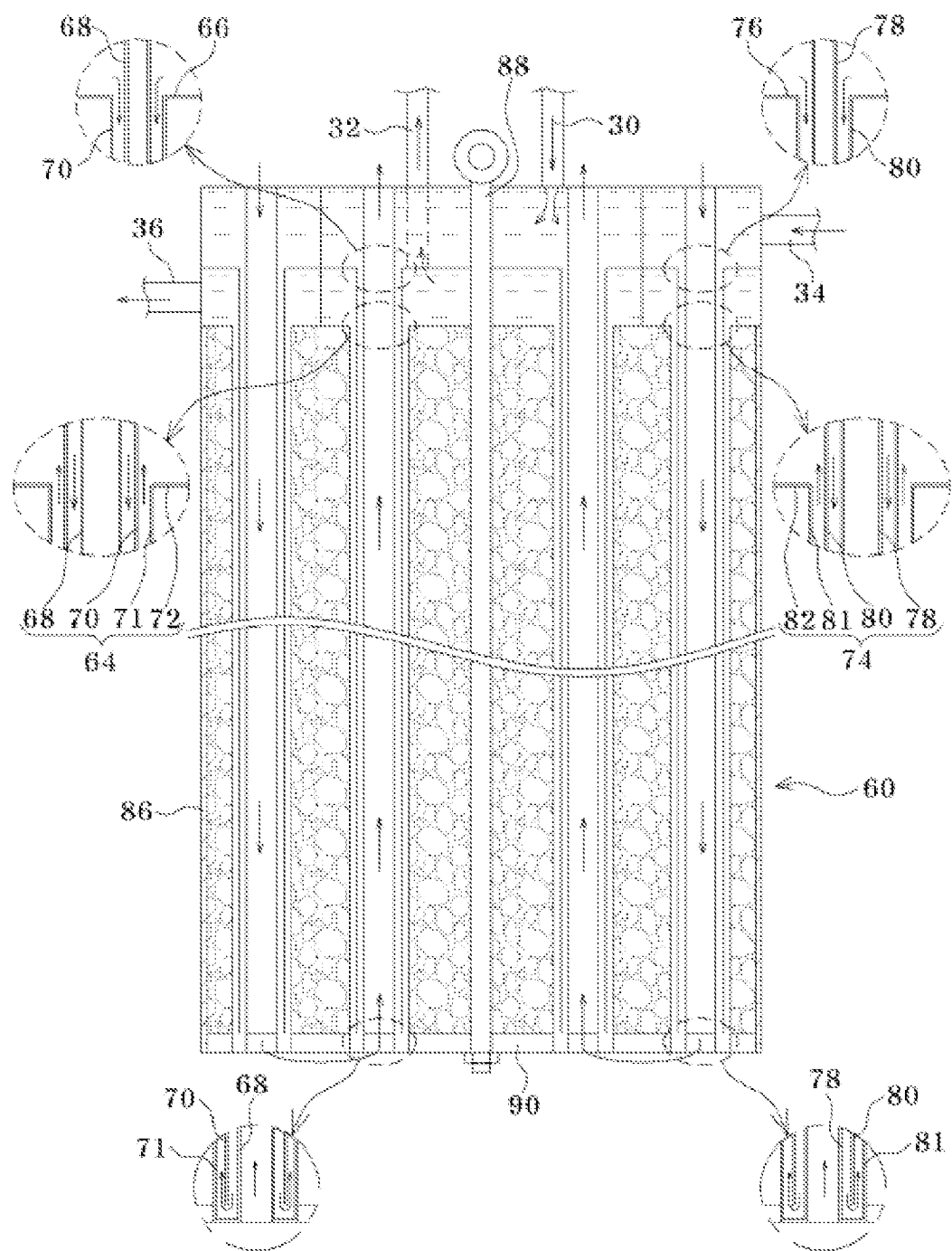
FIG. 8 is a sectional view showing the assembled heat exchanger according to the embodiment of the present invention.
Figure 9:
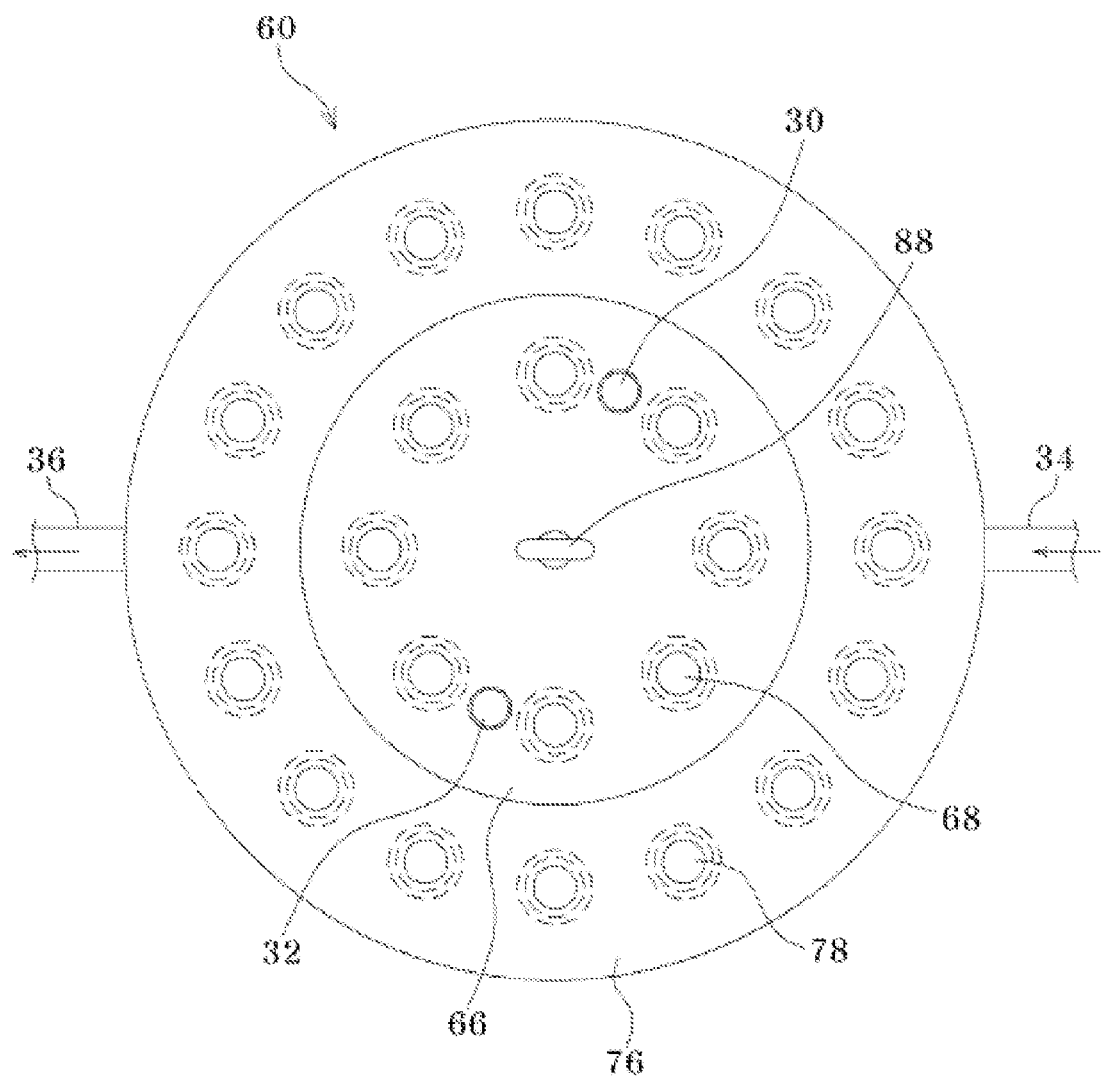
FIG. 9 is a plan view showing the heat exchanger according to the embodiment of the present invention.
Figure 10:
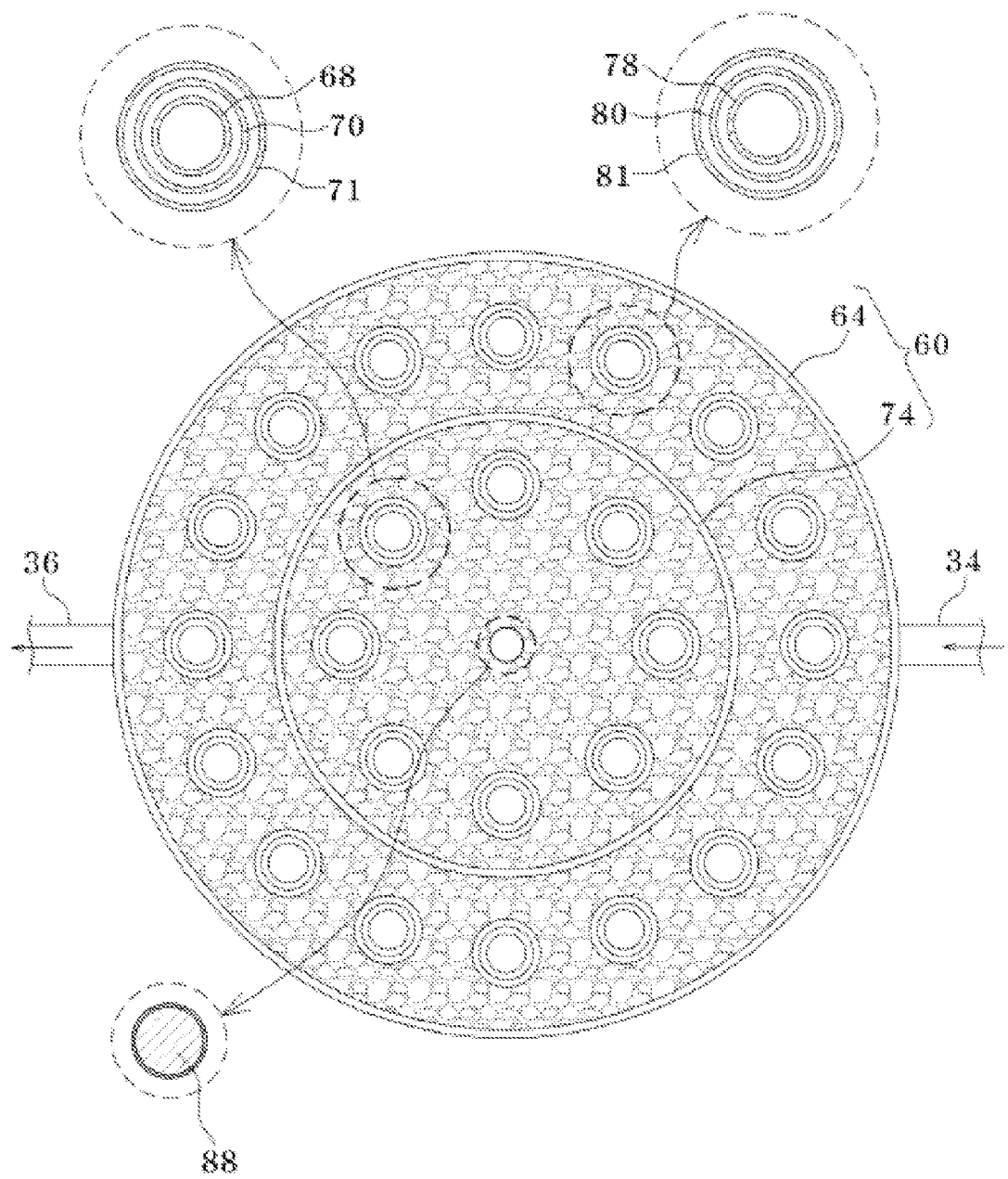
FIG. 10 is a sectional view taken along line A-A of FIG. 9, showing the heat exchanger according to the present invention.
Figure 11:
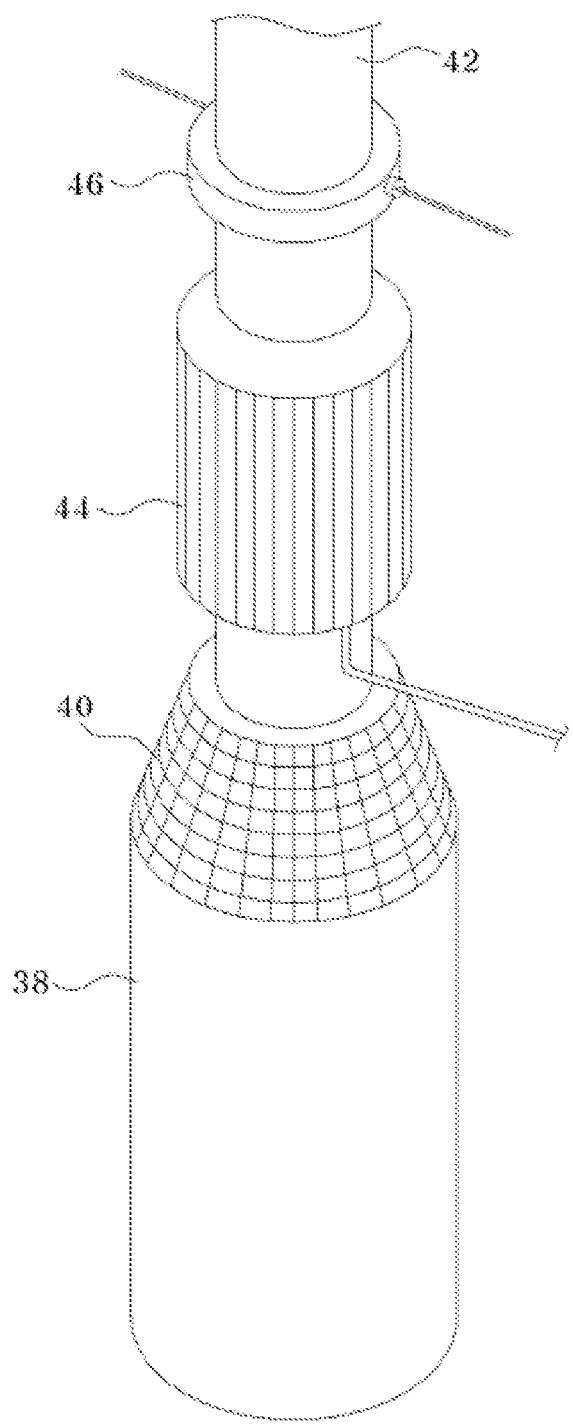
FIG. 11 is a perspective view showing the external shape of the duct structure, according to another embodiment of the present invention.
Figure 12:
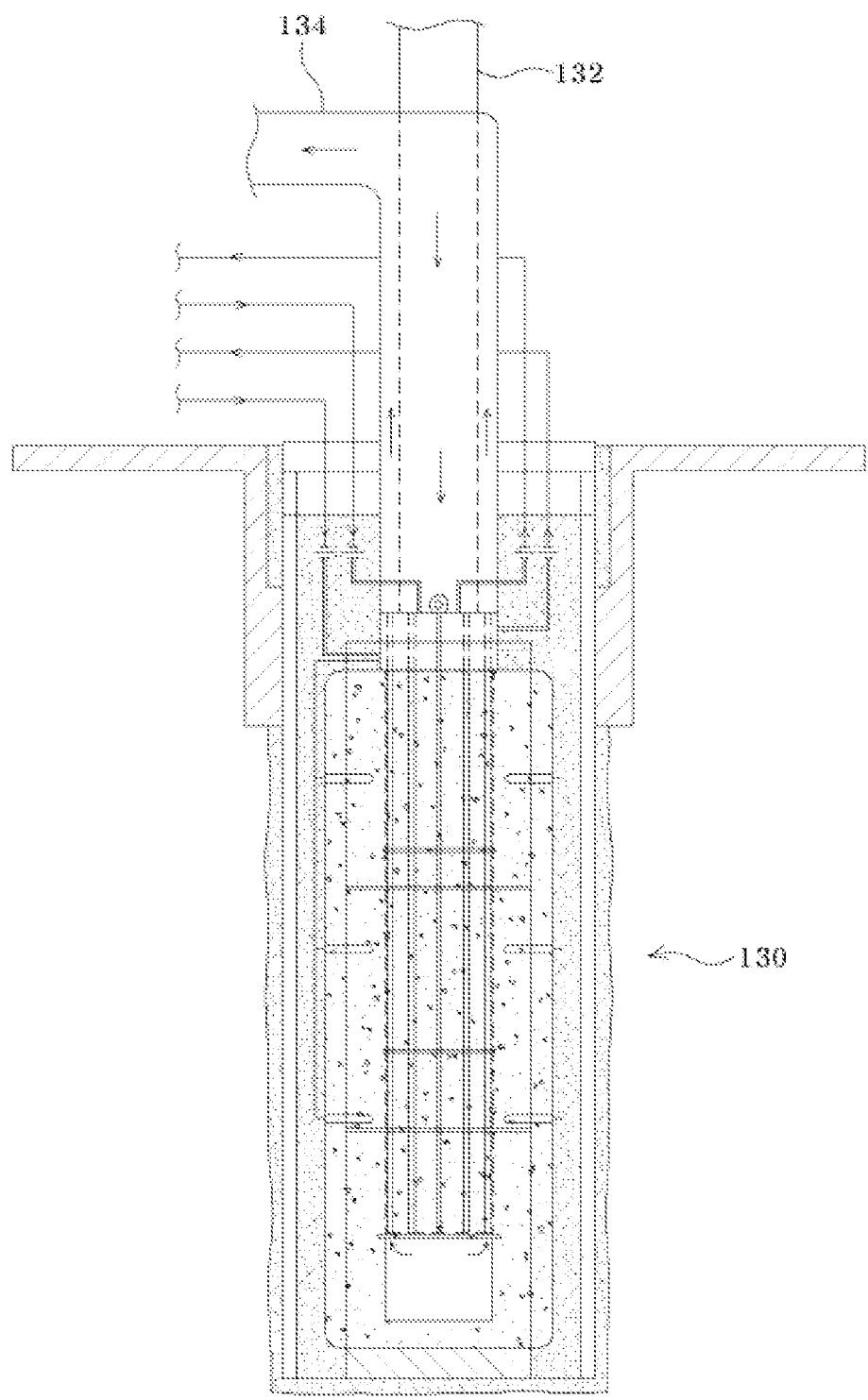
FIG. 12 is a sectional view showing the construction of a cold storage apparatus according to an embodiment of the present invention.

FIG. 1 is a schematic view showing the construction of a hybrid renewable energy system having an underground heat storage apparatus, according to an embodiment of the present invention. FIG. 2 is a perspective view of a solar collector according to the embodiment of the present invention. FIG. 3 is a plan view of the solar collector according to the embodiment of the present invention. FIG. 4 is a sectional view showing a portion of the solar collector according to the embodiment of the present invention. FIG. 5 is a sectional view showing the entire construction of the heat storage apparatus according to the present invention, illustrating an embodiment of a duct structure. FIG. 6 is a sectional view showing the construction of the heat storage apparatus according to the present invention, illustrating another embodiment of a duct structure. FIG. 7 is an exploded perspective of a heat exchanger of the heat storage apparatus according to the embodiment of the present invention. FIG. 8 is a sectional view showing the assembled heat exchanger according to the embodiment of the present invention. FIG. 9 is a plan view showing the heat exchanger according to the embodiment of the present invention. FIG. 10 is a sectional view taken along line A-A of FIG. 9, showing the heat exchanger according to the present invention. FIG. 11 is a perspective view showing the external shape of the duct structure, according to another embodiment of the present invention. FIG. 12 is a sectional view showing the construction of a cold storage apparatus according to an embodiment of the present invention.

As shown in FIGS. 1 through 12, a hybrid renewable energy system according to an embodiment of the present invention includes a solar collector 10, a transfer pipe 30, a heat storage apparatus 50, a return pipe 32, an inlet pipe 36 and a connection duct 42.

The solar collector 10 is installed on or around a building structure 2 and collects solar heat to heat a heat medium that flows through a pipe conduit.

The heat medium preferably comprises silicone oil. The evaporation point of silicone oil is 315° C. or more.

In the case of water, gas bubbles rise from water at 78° C. or more because of a reduction in the density, resulting in a deterioration in the pumping performance and circulation. On the other hand, silicone oil has high viscosity even at a high temperature, thus maintaining superior pumping performance and circulation. Therefore, silicone oil is a heat medium that is very suitable for a high-heat system.

Of course, other kinds of fluid may be used as the heat medium as necessary.

The solar collector 10 includes a main pipe 12, an auxiliary pipe 14 and a heat absorption plate 16. The main pipe 12 is connected to the return pipe 32. The heat medium flows from the return pipe 32 into the main pipe 12. The auxiliary pipe 14 is connected to the transfer pipe 30 so that the heat medium is supplied from the auxiliary pipe 14 into the transfer pipe 30. The heat absorption plate 16 is connected to a sidewall of the main pipe 12 and a sidewall of the auxiliary pipe 14. The heat medium flows along a passage defined in the heat absorption plate 16. The heat absorption plate 16 has a corrugated shape to absorb heat using a reflective operation of a solar radiant heat.

The main pipe 12 and the auxiliary pipe 14 preferably have circular or polygonal cross-sections.

The heat absorption plate 16 is configured such that two panels are spaced apart from each other by a predetermined distance to define the passage along which the heat medium flows.

Further, a black paint layer 18 is applied to an upper surface of the heat absorption plate 16 to enhance the rate of solar heat absorption.

The solar collector 10 further includes support brackets 20 which support the main pipe 12, the auxiliary pipe 14 and the heat absorption plate 16 and are spaced apart from each other at regular intervals.

Each support bracket 20 has a planar shape and is perpendicularly connected to the main pipe 12, the auxiliary pipe 14 and the heat absorption plate 16. Thus, the support brackets 20 prevent the elements from being twisted, sustain expansion pressure, and reinforce the elements which may deform due to a change of temperature, thereby enhancing the durability of the solar collector 10.

In this embodiment, the support brackets 20 comprise four support brackets 20.

The number of support brackets 20 may be changed as necessary.

The transfer pipe 30 transfers high-temperature heat medium, which is supplied thereinto from the solar collector 10, to the underground.

The black paint layer 18 of the heat absorption plate 16 of the solar collector 10 absorbs solar radiant heat of 300° C. or more over the entire area thereof and heats the heat medium, which is silicone oil having an evaporation point of 315° C. or more, to 200° C. or more before the heat medium is supplied into the transfer pipe 30 via the auxiliary pipe 14.

The heat storage apparatus 50 stores heat received from the heat medium that is transferred from the transfer pipe 30. Heat that has been stored is transferred both to cold water that is drawn into the heat storage apparatus 50 from the building structure 2 through the supply pipe 34 and to cold air that is drawn thereinto from an inlet duct 38.

The heat storage apparatus 50 includes a housing 52, an underground heat storage 54, a heat exchanger 60 and a cover 58.

The housing 52 has a predetermined space therein and is installed in an installation hole 51 which is formed underground.

Preferably, the housing 52 comprises a concrete pipe.

Of course, as necessary, other kinds of materials may be used to form the housing 52.

The installation hole 51 is preferably formed by digging the ground using a drill.

The underground heat storage 54 is preferably configured such that the inner and outer vicinity of the housing 52 is filled with sand. Stones or pebbles are disposed in the housing 52.

It is preferable that the strength of the stones be high. Because stones having melting points higher than 1600° C. were formed by slowly cooling and solidifying lava for a very long period of time, the strength thereof is very high. Inversely, when these stones are slowly heated, the stones can very efficiently absorb heat. Therefore, such stones are heat storage members which are very suitable for absorbing a large amount of heat.

As necessary, in the underground heat storage 54, space between the stones or pebbles may be filled with fine pebbles or coarse sand. Space around the underground heat storage 54 is filled with sand.

Preferably, the sand that is charged into the space around the underground heat storage 54 comprises fine sand for the sake of convenience of recovery of the sand using a vacuum sucking method, when necessary.

The underground heat storage 54 comprises a casing made of stainless steel.

The cover 58 covers the heat storage apparatus above a waterproofing concrete pad that is disposed on the ground above the heat exchanger 60.

Preferably, a fine sand layer and a regular sand layer are successively placed on the cover 58 and the heat exchanger 60.

A heat insulation pad 59 may be further provided between the cover 58 and the fine sand layer on the heat exchanger 60 to enhance insulation performance.

The heat exchanger 60 is installed in the underground heat storage 54 in such a way that a bottom space 62 is defined below the heat exchanger 60. Heat is stored in the underground heat storage 54 by the heat medium that is transferred from the transfer pipe 30. The heat medium which has passed through the heat exchanger 60 is sent to the return pipe 32. The heat exchanger 60 transfers the stored heat to cold water transferred form the supply pipe 34 so that hot water is supplied into the building structure 2 through the inlet pipe 36. Furthermore, the heat exchanger 60 heats cold air, drawn from the inlet duct 38, using a descending air vent pipe. The cold air is converted into hot air in an ascending air vent pipe while moving upwards via the bottom space 62. The hot air is discharged through the connection duct 42.

The heat exchanger 60 is a critical core part which is removably provided in the underground heat storage. The heat exchanger 60 has an air and water pipe combination structure comprising triple pipes including an air vent pipe on a center thereof. The heat exchanger 60 has a double or multiple separation structure and is manufactured so as to be separable into a heat storage part for heat medium circulation, a heat exchanger part for supplying hot water, and a heat exchanger part for supplying hot water for heating a room. As such, the heat exchanger 60 is a multi-functional heat exchanger having a separable structure.

The heat exchanger 60 includes a first heat exchanger 64, a second heat exchanger 74 and a support unit 84 which is provided around a central axis of the heat exchanger 60.

The first heat exchanger 64 transfers heat from the heat medium, supplied from the transfer pipe 30, to the surrounding stones or pebbles so that the heat is stored in the stones or pebbles. The heat medium which has passed through the first heat exchanger 64 is sent to the return pipe 32. The first heat exchanger 64 is connected to the connection duct 42.

The first heat exchanger 64 includes a first supply member 66, a plurality of first air pipes 68, a plurality of first inner pipes 70, a plurality of first outer pipes 71 and a first storage member 72.

The first supply member 66 temporarily stores a high-temperature heat medium that is supplied from the transfer pipe 30 and then transfers the heat medium downwards.

The first air pipes 68 extend from the first supply member 66 upwards and downwards. The first air pipes 68 transfer heat from the heat medium, which moves downwards around the first air pipes 68, to air which flows through the first air pipes 68. The heated air is thereafter supplied to the connection duct 42.

The first air pipes 68 function as ascending air vent pipes along which hot air moves upwards to the connection duct 42.

Referring to FIGS. 7 and 8, the first air pipes 68 extend from the top of the heat exchanger 60 to the bottom thereof.

Each first inner pipe 70 surrounds the corresponding first air pipe 68 in such a way that a space is defined between the first inner pipe 70 and the first air pipe 68. A heat medium flows from the first supply member 66 through this space.

In other words, the heat medium moves downwards through the space defined between a circumferential outer surface of the first air pipe 68 and an inner surface of the first inner pipe 70.

Each first outer pipe 71 surrounds a lower end of the corresponding first air pipe 68. The heat medium that has moved along the outer surface of the first air pipe 68 turns around on a lower end of the first inner pipe 70 and moves upwards along an inner surface of the first outer pipe 71. While the heat medium moves upwards along the first outer pipe 71, the heat medium gives heat to its vicinity to perform heat storage.

The lower end of the first air pipe 68 and the lower end of the first outer pipe 71 extend the same distance. The lower end of the first inner pipe 70 extends for a distance shorter than that of the first air pipe 68 or the first outer pipe 71 so that the heat medium which has moved downwards turns upwards on the lower end of the first inner pipe 70.

The first storage member 72 abuts on a lower surface of the first supply member 66. The first storage member 72 temporarily stores the heat medium that has moved upwards through the first outer pipe 71, before the heat medium is returned to the return pipe 32.

Preferably, the first supply member 66 and the first storage member 72 have the same storage capacity.

Of course, as necessary, the storage capacity of the first supply member 66 and the first storage member 72 may be variously changed.

Meanwhile, the second heat exchanger 74 is provided around the first heat exchanger 64 in such a way that the first heat exchanger 64 is inserted into the second heat exchanger 74. The second heat exchanger 74 transfers heat, which has been stored in the stones or pebbles, to cold water which has been transferred therein from the supply pipe 34, thus forming hot water. The hot water is supplied into the inlet pipe 36. Further, cold air, which has been drawn therein from the inlet duct 38, is heated while passing through the air vent pipes of the first heat exchanger 64 via the bottom space 62 before being supplied into the connection duct 42.

The second heat exchanger 74 includes a second supply member 76, a plurality of second air pipes 78, a plurality of second inner pipes 80, a plurality of second outer pipes 81 and a second storage member 82.

The second supply member 76 temporarily stores cold water that is supplied from the supply pipe 34 and then transfers the cold water downwards.

The second air pipes 78 extend from the second supply member 76 upwards and downwards. The second air pipes 78 transfer cold air, which is supplied thereinto from the inlet duct 38, downwards.

The second air pipes 78 function as the descending air vent pipes along which cold air that is supplied from the inlet duct 38 moves downwards to the bottom space 62.

Referring to FIGS. 7 and 8, the second air pipes 78 extend from the top of the heat exchanger 60 to the bottom thereof.

Each second inner pipe 80 surrounds the corresponding second air pipe 78 in such a way that a space is defined between the second inner pipe 80 and the second air pipe 78. Cold water flows from the second supply member 76 through this space.

In other words, the cold water moves downwards through the space defined between a circumferential outer surface of the second air pipe 78 and an inner surface of the second inner pipe 80.

Each second outer pipe 81 surrounds a lower end of the corresponding second air pipe 78. The cold water that has moved along the outer surface of the second air pipe 78 turns around on a lower end of the second inner pipe 80 and moves upwards along an inner surface of the second outer pipe 81. While the cold water moves upwards along the second outer pipe 81, the cold water absorbs heat from the vicinity that has stored heat, thus being converted into hot water.

The lower end of the second air pipe 78 and the lower end of the second outer pipe 81 extend for the same distance. The lower end of the second inner pipe 80 extends for a distance shorter than that of the second air pipe 78 or the second outer pipe 81 so that the cold water which has moved downwards turns upwards on the lower end of the second inner pipe 80.

The second storage member 82 abuts on a lower surface of the second supply member 76. The second storage member 82 temporarily stores the hot water that has moved upwards through the second outer pipe 81, before the produced hot water is supplied into the building structure through the inlet pipe 36.

The produced water that is supplied into the building structure 2 through the inlet pipe 36 is used as hot water, for example, used in a shower, or water for heating a room.

The existing water supply system and room heating system that are in the building structure can be used without changing their structures.

Meanwhile, although the produced water has been illustrated as being used both as hot water and as water for heating a room, as necessary, a third heat exchanger having the same structure as that of the second heat exchanger 74 may be further provided around the heat exchanger 60 to make a separate hot water circulation system which supplies water for heating a room to the building structure.

Of course, a plurality of heat exchangers having the same structure as that of the second heat exchanger 74 may be further provided around the third heat exchanger, as necessary.

It is preferable that the second supply member 76 and the second storage member 82 have the same storage capacity.

Of course, as necessary, the storage capacity of the second supply member 76 and the second storage member 82 may be variously changed.

The support unit 84 supports stones or pebbles provided in the first and second heat exchangers 64 and 74.

The support unit 84 includes a net member 86, a support shaft 88 and a plurality of support plates 90. The net member 86 surrounds the circumferential outer surface of the second heat exchanger 74 and keeps the stones or pebbles therein. The support shaft 88 is longitudinally disposed in the center of the first heat exchanger 64. The support plates 90 are fastened to the support shaft 88 at positions spaced apart from each other to form a multistory structure. The support plates 90 support the stones or pebbles which are disposed in space between the first and second outer pipes 71 and 81.

The net member 86 has a cylinder shape which is open on opposite ends thereof.

Fastening members, such as nuts or the like, are welded to or threaded over the support shaft 88 just above and below each support plate 90, which is provided on medial portions of the support shaft 88, so as to sustain the weight of the support plate 90.

Preferably, the support plates 90 are disposed at positions spaced apart from each other in the longitudinal direction of the second heat exchanger 74 at regular intervals.

The support plate 90 that is disposed at the lowermost position is preferably fastened to the support shaft 88 by thread coupling.

To charge stones or pebbles into the net member 86 after the heat exchanger 60 has been inserted into the net member 86, the heat exchanger 60 is turned upside down. Thereafter, stones or pebbles are charged into the net member 86 to a predetermined height. Subsequently, a fastening member is fitted over the support shaft 88, one support plate 90 is fitted over the support shaft 88, and another fastening member is fitted over the support shaft 88 to fasten the support plate 90 to the support shaft 88. Thereafter, the above-mentioned stone or pebble charging process and the support plate fastening process are repeated.

After the process of charging stones or pebbles into the heat exchanger 60 has completed, the heat exchanger 60 is turned upside down to its original state. Subsequently, after holding an upper hook of the support shaft 88 using a crane, the heat exchanger 60 is inserted into the central space of the underground heat storage 54. Thereafter, space above the heat exchanger 60 is filled with general sand and fine sand and then is covered with the cover 58, thus completing the assembly and installation of the heat exchanger 60.

Meanwhile, a first end of the connection duct 42 is connected to a boundary surface between the first heat exchanger 64 and the second heat exchanger 74. A second end of the connection duct 42 is connected to an upper portion of the building structure 2 to supply hot water into the building structure 2 and heat the room.

Further, a first end of the inlet duct 38 is connected to a circumferential edge of the second heat exchanger 74 in such a way that the inlet duct 38 is spaced apart from the circumferential outer surface of the connection duct 42.

The return pipe 32 functions to return the heat medium from the heat storage apparatus 50 to the solar collector 10.

The inlet pipe 36 supplies hot water created by the heat storage apparatus 50 into the building structure 2.

The connection duct 42 supplies air heated by the heat storage apparatus 50 into the building structure 2 to heat the room.

As shown in FIGS. 1 and 5, the duct structure according to an embodiment of the present invention is a structure for domestic or industrial use. The inlet duct 38 is connected at a second end thereof to a lower portion of the building structure 20. The inlet duct 38 transfers cold air, which is formed by cooling in the building structure 2, to the vicinity of the connection duct 42 in the horizontal direction and then supplies the cold air downwards to the heat storage apparatus 50.

In other words, the second end of the inlet duct 38 is connected to the building structure 2 at a position lower than the position at which the connection duct 42 is connected to the building structure 2.

Meanwhile, as shown in FIG. 6, a duct structure according to another embodiment of the present invention is a structure for industrial use or power generation. In this embodiment, the second end of the inlet duct 38 is connected to the atmosphere rather than being connected to the building structure. A screen 40 is provided at an angle on the second end of the inlet duct 38 so that outside air is drawn into the inlet duct 38 via the screen 40.

The screen 40 functions to prevent impurities in the air from entering the inlet duct 38.

In the duct structure according to this embodiment, a turbine generator 44 is provided on the connection duct 42 which is disposed inside the inlet duct 38. The turbine generator 44 generates electricity in such a way that a fan is operated by hot air that ascends through the connection duct 42.

The turbine generator 44 has a typical well known structure, therefore further detailed explanation thereof will be omitted.

Furthermore, a steam jet unit 46 is further provided on the connection duct 42. The steam jet unit 46 supplies high-temperature and high-pressure steam to hot air that ascends through the connection duct 42 so as to further increase the temperature of the hot air using latent heat and increase the speed of the flow of air.

In this embodiment, because the steam jet unit 46 supplies high-temperature steam (of about 300° C. to 400° C.) to hot air, the hot air that is ascending is converted into higher-temperature steam, and the speed at which the hot air ascends is increased. The steam jet unit 46 is operated in the same manner as that of creating an artificial cyclone.

In other words, the principle of the operation of the steam jet unit 46 is similar to that of the creation of a tornado in a particular area. Descending high-density lower-temperature air that is adjacent to the ground because of the Earth's gravitational force is drawn by atmospheric pressure into the double duct underground and then moved downwards through the air vent pipes of the heat exchanger 60 of the underground heat storage. Thereafter, the air is heated while moving upwards through the heat exchanger 60 and is converted into high-temperature and low-density light air. The converted high-temperature air vertically ascends aboveground.

While the ascending hot air passes through the connection duct 42 that extends from the ground upwards, the flow of air is accelerated by a stack effect due to an atmospheric pressure difference, thus creating ascending wind power.

That is, this is a wind power generation system in which high-temperature and high-pressure steam is jet into ascending hot air to convert the hot air into higher-temperature air due to latent heat and accelerate the flow of air so that strong vertical ascending wind power is generated by their combined power, thus generating electricity using the wind power.

In other words, the steam jet unit 46 is connected to a high-positioned vent (not shown) by the connection duct 42. Thereby, the flow of low-density light hot air is primarily accelerated by the stack effect due to an atmospheric pressure difference to generate ascending wind power, and the flow of the hot air secondarily accelerates resulting from an increase in the temperature of the hot air due to latent heat by supplying high-pressure high-temperature steam to the air, thus generating further strong ascending wind power. As such, the steam jet unit 46 functions as an air heating device.

Therefore, as the speed of the flow of hot air that ascends through the connection duct 42 increases, a lot of electricity can be generated by the turbine generator 44. This produced electricity may be used in the building structure, for example, a factory, or be sold.

The underground heat storage 54 includes a plurality of thermoelectric elements 56 which heat the stones or pebbles that are stored therein.

The thermoelectric elements 56 are operated by electricity from a solar electric module 22 which is installed in or around the building structure 2.

The structure of the solar electric module 22 is a typical one, therefore further explanation will be skipped.

The underground heat storage apparatus according to the present invention is a high heat energy operating system which uses heat of 500° C. or more when it is used for domestic or industrial purposes and uses heat of 900° C. or more when used for industrial purposes or power generation. The present invention can innovate on the technology using solar heat.

Meanwhile, the hybrid renewable energy system according to the present invention further includes a cold storage system 110 which is installed in the building structure 2 or a shaded area around the building structure 2. The cold storage system 110 stores coldness (for example, coldness obtained from snow) underground in the winter season and transfers the stored coldness into the building structure 2 in the summer season to cool the room.

The cold storage system 110 includes a coldness collector 120, a cold storage apparatus 130 and a cold air supply apparatus 135.

The coldness collector 120 is installed in or around the building structure 2 and includes a pipe along which a heat medium flows. In the winter season, the heat medium is cooled by giving heat to cold air.

Preferably, the heat medium used in the cold storage system 110 also comprises silicone oil. The freezing point of the silicone oil is 72° C. or less. Thus, there is no fear of the pipe freezing and bursting. Because the rate of change in the viscosity of silicone oil is low even at a low temperature, the pumping performance for circulation can be maintained even at a temperature of 30° C. or less. Therefore, silicone oil is a heat medium that is very suitable for a circulating cold storage system.

The cold storage system 110 is a cooling system. The coldness collector 120 is installed in a northern outer wall of the building structure 2 or a shaded area around the north side of the building structure 2. The coldness collector 120 is operated in the winter in such a way that the heat medium loses heat to low temperature air of 15° C. or less, and coldness is stored in a cold storage while the heat medium circulates. In the summer, the coldness that has been stored is used to cool the building structure. This system is a new technology which uses coldness as renewable energy.

The coldness collector 120 has the same structure as that of the solar collector 10, but the coldness collector 120 receives coldness in the winter and stores the coldness underground while the heat medium circulates between the coldness collector 120 and the underground. In other words, the heat exchange process of the coldness collector 120 is the reverse of that of the solar collector 10.

The heat medium that has provided heat to the outside cold air by the coldness collector 120 to obtain coldness is transferred underground through the corresponding pipe. The cold storage apparatus 130 stores the coldness underground. In the summer, the cold storage apparatus 130 cools air drawn therein from an inner duct 132 and supplies the cooled air into the room of the building structure 2 through an outer duct 134.

The outer duct 134 is provided around the inner duct 132 and is connected to the upper portion of the building structure 2 so that air heated in the building structure 2 is transferred to the cold storage apparatus 130 by the outer duct 134.

Meanwhile, the structure of the cold storage apparatus 130 is the same as that of the heat storage apparatus 50, other than the reverse heat circulation process. In other words, coldness in place of heat is stored, and coldness stored in the winter is used to cool the room in the summer, unlike the heat circulation process of the heat storage apparatus 50.

The cold storage apparatus uses the same principle as that of the Dong ice-warehouse and the Seo ice-warehouse which were used in Korea long time ago to store ice in the winter and eat the ice in the summer.

Because the cold storage apparatus 130 has the same structure as that of the heat storage apparatus 50, the above description of the heat storage apparatus 50 will substitute for that of the cold storage apparatus 130.

The cold storage apparatus 130 may further include an auxiliary refrigerator using a refrigerant circulation cycle.

The auxiliary refrigerator can be used in the summer.

The cold air supply apparatus 135 supplies cold air into the room of the building structure 2 in such a way that a cold medium flowing through a coldness pipe receives coldness that has been stored in the cold storage apparatus 130, and the cold medium is supplied to the building structure 2 by a circulation pump.

The cold medium preferably comprises silicone oil.

The cold air supply apparatus 135 has the same structure and principle as those of a heater which is used in the winter.

As described above, the hybrid renewable energy system according to the present invention stores heat underground using solar energy or stores coldness underground and regenerates heat or coldness depending on a season to heat or cool a building structure, thus enhancing renewable energy efficiency Furthermore, the present invention stores high energy in an underground heat storage from unlimited solar energy and produces clean energy with low expenses anywhere 365 days a year 24 hours a day.

In addition, the present invention is configured such that a heat absorption plate heats a heat medium over the entire area, thus markedly increasing the efficiency of solar radiant heat absorption.

Unlike the conventional technique which uses water having an evaporation point of 100° C. as a heat medium, in the present invention, silicone oil having an evaporation point of 315° C. or more is used as a heat medium, and the entire area of the heat absorption plate absorbs solar radiant heat of 300° C. or more, so that the absorption temperature of the heat medium can become 200° C. or more.

Furthermore, a heat exchanger which is removably provided in the heat storage apparatus has an air and water pipe combination structure in a triple pipe structure. Thus, heat of the heat medium supplied from a solar collector can be easily absorbed by heat storage members, such as stones, pebbles, sand, etc., which are stored in the underground heat storage. The heat storage members are configured so as to be removable from the heat exchanger, thus facilitating the assembly of the heat storage apparatus.

Further, air in the building structure is supplied into the heat storage apparatus by a blower fan, absorbs heat from the heat storage members, such as stones, pebbles, sand, etc., which are stored in the underground heat storage, to create hot air, and further absorbs heat from the heat medium to further increase the temperature thereof while moving upwards from the heat storage apparatus, before it is ultimately supplied into the building structure. As such, the present invention can be used as an air conditioner for heating. Therefore, room heating efficiency is enhanced, and the cost of equipment is markedly reduced, compared to a typical heating system using hot water.

Moreover, in the present invention, hot air that is ascending through a connection duct of the heat storage apparatus is accelerated by stack effect due to a atmospheric pressure difference using an air vent provided on the ground. High-temperature high-pressure stream which is produced in the heat storage apparatus is jet to the upstream hot air so that the hot air is converted into higher-temperature air by latent heat. Thereby, the ascending force of the air is further increased, thus producing strong wind power.

In addition, a turbine generator which is provided on a medial portion of a chimney structure generates electricity from this vertical ascent wind power. Therefore, the present invention can provide a generation plant system which generates a large amount of electricity inexpensively, compared to any existing generation system.

Furthermore, a solar electric module is provided on the top of the building structure to generate electricity using solar light. Some of generated electricity is used in the building structure, and the remaining electricity is used for heat storage in the heat storage apparatus after passing through a heat conversion process. Therefore, renewable energy can be more reliably supplied to the building structure, thus further enhancing the utilization of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Therefore, the technical bounds of the present invention must be defined by the following claims.

What is claimed is:

1. A hybrid renewable energy system, comprising:
a solar collector comprising a heat medium and configured to be provided on or in a vicinity of the building structure, the solar collector being configured for collecting solar heat to heat the heat medium that flows through a pipe conduit provided in the solar collector;
a transfer pipe connected to the pipe conduit of the solar collector and configured for transferring the heat medium heated by the solar collector into an underground;
a heat storage apparatus connected to the solar collector through the transfer pipe, installed underground, and configured for storing heat received from the heat medium therein and for heating, using the stored heat, both cold water supplied from the building structure through a supply pipe connected between the building structure and the heat storage apparatus and configured for introducing the cold water from the building structure to the heat storage apparatus and air supplied from an inlet duct connected between the building structure and the heat storage apparatus and configured for introducing the air from the building structure to the heat storage apparatus;
a return pipe connected from the heat storage apparatus to the solar collector and configured for returning the heat medium from the heat storage apparatus to the solar collector;
an inlet pipe connected from the heat storage apparatus to the building structure and configured for supplying hot water produced by the heat storage apparatus to the building structure; and
a connection duct connected from the heat storage apparatus to the building structure and configured for collecting and supplying air heated by the heat storage apparatus into the building structure to heat a room of the building structure,
wherein the heat storage apparatus comprises:
a housing installed in an installation hole formed underground, the housing having a predetermined space therein;
an underground heat storage configured such that inner and outer vicinity of the housing is filled with sand, and stones or pebbles are disposed in the housing;
a heat exchanger installed in the underground heat storage in such a way that a bottom space is defined below the heat exchanger, wherein heat is stored in the underground heat storage by the heat medium that is transferred from the transfer pipe, and the heat medium which has passed through the heat exchanger is sent to the return pipe, the heat exchanger transferring the stored heat to cold water transferred form the supply pipe so that hot water is supplied into the building structure through the inlet pipe, the heat exchanger having a vent pipe along which cold air supplied from the inlet duct is moved upwards via the bottom space and is converted into hot air before being discharged to the connection duct; and
a turbine generator generating electricity in such a way that a fan is operated by hot air that ascends through the connection duct obtained by heating up the cold air from outside,
wherein the heat storage apparatus comprises a cover covering the heat exchanger,
wherein the underground heat storage comprises a plurality of thermoelectric heaters disposed through the sand, the stone, or the pebbles in the underground heat storage and configured for applying heat to the stones or pebbles stored in the underground heat storage, the thermoelectric heaters being configured for being operated by electricity produced by a solar electric module installed in the building structure or in the vicinity of the building structure,
wherein the heat medium comprises a silicone oil,
wherein the heat exchanger comprises:
a first heat exchanger configured such that the heat medium supplied from the transfer pipe transfers heat to the surrounding stones or pebbles to store the heat and is returned to the return pipe, the first heat exchanger being connected to the connection duct;
a second heat exchanger provided around the first heat exchanger, the second heat exchanger transferring the stored heat from the stones or pebbles to cold water transferred from the supply pipe so that hot water is supplied into the inlet pipe, the second heat exchanger heating cold air, supplied from the inlet duct, while the cold air passes through the air vent pipes of the first heat exchanger via the bottom space before being supplied into the connection duct; and
a support supporting the stones or pebbles provided in the first and second heat exchangers, so that the heat exchanger has three layered structure.

2. The hybrid renewable energy system as set forth in claim 1, wherein the solar collector comprises:
- a main pipe connected to the return pipe so that the heat medium flows from the return pipe into the main pipe;
- an auxiliary pipe connected to the transfer pipe so that the heat medium is supplied from the auxiliary pipe into the transfer pipe; and
- a heat absorption plate connected to a sidewall of the main pipe and a sidewall of the auxiliary pipe so that the heat medium flows along a passage defined in the heat absorption plate, the heat absorption plate having a corrugated shape to absorb heat using a reflective operation of a solar radiant heat.

3. The hybrid renewable energy system as set forth in claim 2, wherein a black paint layer is formed on an upper surface of the heat absorption plate, the black paint layer increasing a solar heat absorption rate, and
- the solar collector further comprises a support bracket supporting the main pipe, the auxiliary pipe and the heat absorption plate.

4. The hybrid renewable energy system as set forth in claim 1, wherein the first heat exchanger comprises:
- a first supplier storing a high-temperature heat medium that is transferred from the transfer pipe and supplying the high-temperature heat medium;
- a plurality of first air pipes extending from the first supplier upwards and downwards, the first air pipes transferring heat from the heat medium, moving downwards around the first air pipes, to air flowing through the first air pipes so that the heated air is supplied to the connection duct;
- a plurality of first inner pipes surrounding the respective first air pipes in such a way that space is defined between each of the first inner pipes and the corresponding first air pipe so that the heat medium moves from the first supplier through the space;
- a plurality of first outer pipes disposed in such a way that each of the first outer pipes surrounds a lower end of the corresponding first air pipe, wherein while the heat medium that has moved along an outer surface of the first air pipe turns around on a lower end of the first inner pipe and moves upwards along an inner surface of the first outer pipe, the heat medium transfers heat to a vicinity thereof to store the heat; and
- a first storage abutting a lower surface of the first supplier, the first storage storing the heat medium that has been moved upwards by the first outer pipes, before the heat medium is returned to the return pipe.

5. The hybrid renewable energy system as set forth in claim 1, wherein the second heat exchanger comprises:
- a second supplier storing cold water that is transferred from the supply pipe and supplying the cold water;
- a plurality of second air pipes extending from the second supplier upwards and downwards, the second air pipes transferring cold air, which is supplied from the inlet duct, downwards;
- a plurality of second inner pipes surrounding the respective second air pipes in such a way that space is defined between each of the second inner pipes and the corresponding second air pipe so that the cold water moves from the second supplier through the space;
- a plurality of second outer pipes disposed in such a way that each of the second outer pipes surrounds a lower end of the corresponding second air pipe, wherein while the cold water that has moved along an outer surface of the second air pipe turns around on a lower end of the second inner pipe and moves upwards along an inner surface of the second outer pipe, the cold water absorbs heat from a vicinity thereof and is converted into hot water; and
- a second storage abutting a lower surface of the second supplier, the second storage storing the hot water that has moved upwards by the second outer pipes and supplying the hot water into the building structure through the inlet pipe.

6. The hybrid renewable energy system as set forth in claim 1, wherein the support comprises:
- a net member surrounding a circumferential outer surface of the second heat exchanger, the net member keeping the stones or pebbles therein;
- a support shaft longitudinally disposed in a center of the first heat exchanger; and
- a plurality of support plates fastened to the support shaft at positions spaced apart from each other to form a multi-story structure, the support plates supporting the stones or pebbles disposed in a space between the first and second outer pipes.

7. The hybrid renewable energy system as set forth in claim 1, wherein a first end of the connection duct is connected to a boundary surface between the first heat exchanger and the second heat exchanger, and a second end of the connection duct is connected to an upper portion of the building structure, and
- a first end of the inlet duct is connected to a circumferential edge of the second heat exchanger in such a way that the inlet duct is spaced apart from a circumferential outer surface of the connection duct by a predetermined distance.

8. The hybrid renewable energy system as set forth in claim 7, wherein a second end of the inlet duct communicates with an outside air so that the outside air is drawn into the second end of the inlet duct, and a screen is provided at an angle on the second end of the inlet duct.

9. The hybrid renewable energy system as set forth in claim 7, wherein a second end of the inlet duct is connected to the room of the building structure at a position lower than the connection duct.

10. The hybrid renewable energy system as set forth in claim 1, further comprising:
- a cold storage system installed in a shaded area in or around the building structure, the cold storage system storing coldness into the underground structure in a winter season and transferring the stored coldness into the building structure in a summer season to cool the room of the building structure.

11. The hybrid renewable energy system as set forth in claim 10, wherein the cold storage system comprises:
- a coldness collector installed in a shaded area in or around the building structure, the coldness collector having a pipe along which a heat medium flows so that the heat medium absorbs coldness in the winter season;
- a cold storage apparatus supplying the heat medium from the coldness collector into the underground through a pipe and storing the coldness underground, the cold storage apparatus cooling air drawn therein from an inner duct and supplying the cooled air into the room of the building structure through an outer duct in the summer; and
- a cold air supply apparatus supplying cold air into the room of the building structure in such a way that a cold medium flowing through a coldness pipe receives the coldness that has been stored in the cold storage apparatus, and the cold medium is supplied to the building structure.

12. The hybrid renewable energy system as set forth in claim 1, wherein the hot water supplied into the building structure through the inlet pipe is used for a shower, hot water or heating the room.

\* \* \* \* \*